June 5, 1945.  H. W. WINELAND  2,377,738
GAUGING APPARATUS
Filed Oct. 12, 1943  2 Sheets-Sheet 1
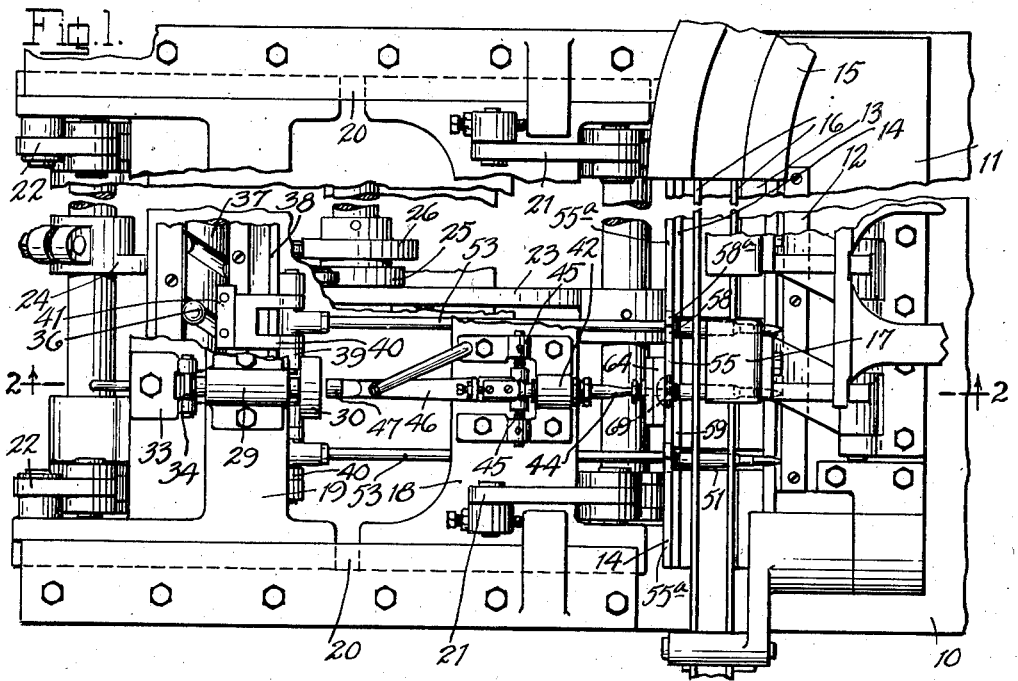
INVENTOR
HARRY W. WINELAND June 5, 1945. H. W. WINELAND 2,377,738
GAUGING APPARATUS
Filed Oct. 12, 1943 2 Sheets-Sheet 2
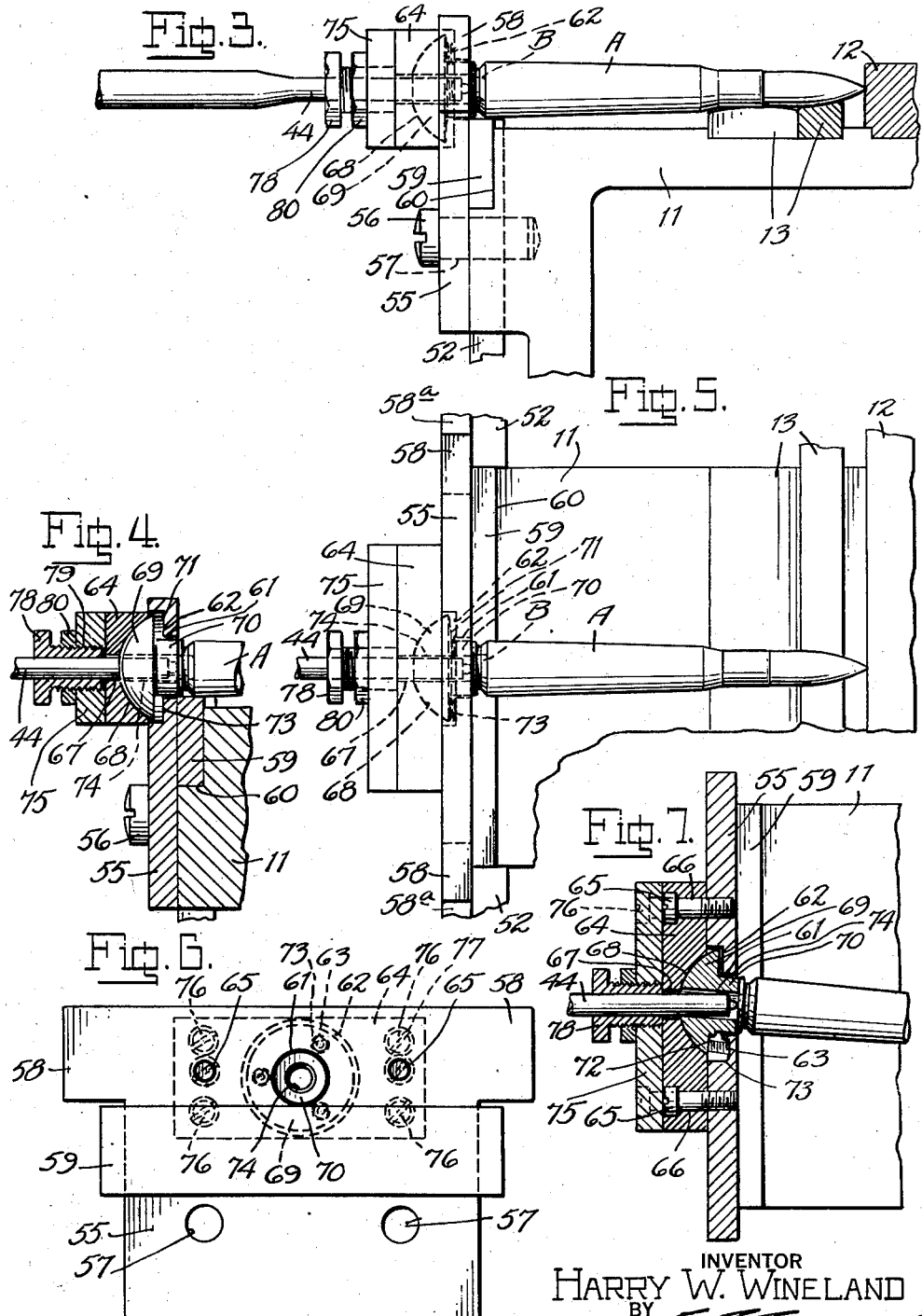
INVENTOR
HARRY W. WINELAND
BY
ATTORNEYS Patented June 5, 1945

2,377,738

UNITED STATES PATENT OFFICE 2,377,738

GAUGING APPARATUS

Harry W. Wineland, Independence, Mo., assignor to Remington Arms Company, Inc., Bridgeport, Conn., a corporation of Delaware Application October 12, 1943, Serial No. 505,921

6 Claims. (Cl. 33—147)

The present invention relates to an improvement in gauging apparatus, and while the apparatus may be used in gauging operations in connection with various types of articles, as will be obvious from the following disclosure, the illustrated form of the invention is especially adapted for the gauging of cartridges, particularly the inspection gauging for primer depth. The depth of the primer in the primer pocket of a cartridge must be extremely accurate as a slightly high primer may impede the automatic feeding of the cartridge in the gun and a slightly low primer may fail to fire. Hence, the allowable tolerance in the height position of the primer is very small, and any shifting from normal of the central gauge contacting point of the primer, such as might be caused by slight tilting misalignment of the cartridge in the gauging machine will result in inaccurate gauging, with the possibility that a great many cartridges that should pass the gauging test will be automatically rejected, while imperfect cartridges will be passed as perfect.

The present gauging apparatus is especially adapted for use in an automatic gauging machine of the type disclosed in the patent to Z. P. Candee for Gauging mechanism, 1,783,404, granted December 2, 1930. In the mechanism disclosed in this patent the cartridge primer depth gauging operation is predicated on the theory that all cartridge cases are in perfect axial alignment with the gauging rod as they pass through the primer depth gauge station. In this mechanism the gauging rod operates through a rigid main plate and is guided by a rigid face plate, which makes no allowance for misalignment of the cartridge cases on the guide bar; hence, if a cartridge case is tilted into slightly misaligned position, the tilting will fulcrum about the peripheral edge of the head of the cartridge case, causing the center of the primer to move away from the face plate, with the result that the gauging rod in gauging contact with the center of the primer will gauge the primer as low, whereas it may in fact be high or perfect.

It is an object of the present invention to provide a gauging apparatus wherein a flexible guide plate is provided for contact with the cartridge case head, and through which the gauging rod is guided, and whereby any tilting misalignment of the cartridge case will fulcrum about the central point of the primer, while the periphery moves inwardly at one side and outwardly at the other side, thus maintaining the central gauging rod contact point at a fixed point with respect to the gauging station irrespective of misalignment of the cartridge case.

With the above and other objects in view, an embodiment of the invention is shown in the accompanying drawings, and this embodiment will be hereinafter more fully described with reference thereto, and the invention will be finally pointed out in the claims.

In the drawings:

Fig. 1 is a fragmentary plan view of a gauging machine having the gauging apparatus of the invention incorporated therein.

Fig. 2 is a vertical sectional view thereof, taken generally along the line 2—2 of Fig. 1.

Fig. 3 is an enlarged side elevation of the gauging apparatus of the invention, showing a cartridge in cooperative relation therewith.

Fig. 4 is a vertical longitudinal sectional view thereof.

Fig. 5 is a top plan view.

Fig. 6 is a front elevation, detached from the gauging machine.

Fig. 7 is a horizontal sectional plan view, showing the cartridge in cooperative relation therewith, and in a laterally tilted misaligned position.

Similar reference characters indicated corresponding parts throughout the several figures of the drawings.

The gauging machine, illustrated as an example of a type of machine in which the gauging apparatus of the invention is especially adapted to be incorporated, automatically gauges or inspects the articles guided therethrough, and usually includes a series of successively arranged gauging or inspection stations for performing various gauging operations, each station including automatic ejection means whereby the articles failing to meet the gauging standard are ejected, so that they are segregated into groups, one for each gauging test. In the operation of this machine, the articles are guided from a dial or other mechanism and conducted by any convenient mechanism to the successive stations where they are automatically gauged. If these successive gaugings are within the allowable tolerances the articles are discharged from the machine into a conveniently arranged receptacle. The gauging apparatus of the present invention is concerned with the gauging operation of determining the primer depth of a cartridge, that is, whether the primer is inserted in the primer pocket to the proper depth, or is high or low. This gauging operation is essentially a length gauging operation along the central axial line of the cartridge case, the point of the bullet being pressed against a fixed abutment and the gauging rod being brought into contact with the center of the primer. While the apparatus is especially adapted for the gauging of cartridge cases, it will be obvious that the invention may be employed for other analogous gauging operations and for other types of articles.

The gauging machine consists generally of a bed plate 10 having fixed thereon a longitudinally extending table 11 provided with an abutment guide bar 12 against which the bullet ends of the cartridges are engaged and one or more track guide bars 13 and 14 upon which the cartridges roll to and between the several inspection stations, being fed to the machine at one end over a guide plate 15 and being intermittently moved along the guide bars in spaced relation to the gauging stations by carrier bars 16. During the gauging operation the cartridges are engaged by holders 17, the carrier bars being so arranged and operated that when the holders move upwardly and away from the cartridges the carrier bars move downwardly and engage them, one cartridge in each of several notches in their lower edges, then moves substantially parallel with the top of the table 11 carrying the articles to the successive stations. When in register with the stations the holder moves downwardly and engages and holds the articles in position for the gauging operation and the carrier bars move to their former position for the next feed movement.

The gauging mechanism is carried upon two slides 18 and 19, having lateral movement toward and away from the table 11 in slideways 20—20 and deriving their movement through link connections 21—21 and 22—22 with rock arms 23 and 24 actuated by cams 25 and 26, the rock arm 23 being maintained in engagement with its cam by means of a spring 27 and the rock arm 24 being maintained in engagement with its cam by means of a spring 28.

Fixed on the slide 19 is a guide block 29 in which is guided a gauge slide 30 having a pin 31 that limits its movement in one direction, and provided at its inner end with a gauging opening 32. Journaled in a bracket 33 secured to the slide 19 is a trip lever 34, engaged at its upper end against the outer end of the slide 30 by means of a spring 35, its lower end being movable into and out of the path of a trip ball 36, which travels in the groove of a worm 37. Fixed to the worm housing 38 in relation to each gauging station is a journal block 39, in which is hinged a rock arm 40 having a cam face 41 that projects over the worm 37 to a point adjacent to a line drawn vertically with the center thereof.

Upon the slide 18 there is secured a head member 42 in which is threaded a sleeve 43 having slidably engaged therein the gauging rod 44, the axis of which is in line with the axis of the cartridge case to be gauged, as will presently more fully appear. Journaled in the blocks 45 held in the head member 42 is the gauging lever 46 carrying a hardened plug 47 at its outer end. Secured to this gauging lever is a gauging plate 48, the end of which is maintained in contact with the end of the gauging rod 44 by a spring 49, and an adjusting screw 50 being provided in the lever for varying the position of the gauging plate as desired. The gauging lever 46 is so formed that the space between the center of the fulcrum thereof, that is the axis of the journals of the blocks 45, and the outer end of the plug 47 is a multiplied length of the distance between said center and the axis of the gauging rod 44, so that any movement of the gauging lever by reason of the variation in position of the gauging rod parallel to its axis is greatly increased at the plug 47, and hence, any variation in the position of the end of the gauging rod as it contacts the primer of the cartridge is magnified in the movement of the plug 47, a too low primer causing the plug to move upwardly, and a too high primer causing it to move downwardly, these entrances being indicated by the dot-and-dash lines in Fig. 2.

The opening 32 in the gauge slide 30 is of such size that it will permit the plug 47 to enter therein within the extremes of the tolerances of variation in the height of the primer. Should there be any variation, due to a too low or a too high primer the magnified movement of the plug 47 of the lever 46 will bring it out of line with the periphery of the opening 32, so that as the slide 19 is moved forwardly the plug will engage the face of the gauge slide, causing the gauge slide to move within the block 29 during the further movement of the slide 19. This action will cause the trip lever 41 to rock upon its pivot mounting, engage the trip ball 36, and move the same in the groove of the worm 37 so that it is on the opposite side of the center thereof. In this new position, outlined by the dot-and-dash lines in Fig. 2, the ball will actuate the rock arm 40 during the rotation of the worm and through this operation actuate the discharge mechanism, presently to be more fully described.

Adjacent to each of the inspecting stations, is a chute 51 through the table 11, one wall of which is closed by a hinged gate 52 between which end the rock arm 40 is a push rod 53, a spring 54, extending between the lower end of the gate and the journal bracket 39, normally retaining the rock arm in gate closing position. When the gate is in its normal position, shown in Fig. 2, the cartridge rides thereover during its travel from one station to the other, but if the preceding cartridge has not measured up to the gauging test, the ball 36 actuates the rock arm 40 as above pointed out, and this in turn moves the gate 52 upon its mounting through the rod 53 against the tension of the spring 54, so that it occupies the position indicated by the dot-and-dash lines in Fig. 2. The support for the cartridge is removed and it drops through the chute 51 to a suitable receptacle.

The mechanism above described forms no part of the present invention, except insofar as it cooperates therewith in the carrying out of the automatic gauging operation, but is herein described in sufficiently general language for a complete understanding of the operation of the apparatus of the invention.

Upon the inner side of the table 11 there is mounted a vertically disposed plate 55 of generally rectangular form secured thereto by means of screws 56 engaged through holes 57 in the plate. The upper portion of the plate 55 projects above the upper side of the table 10 and is extended at each end, as at 58—58, to abut the ends 58ª of the fixed guide plates 55ª of the adjacent gauging stations, substantially centrally of the ejection chute 51, to provide a continuous abutment guide for the head ends of the cartridges A as they are fed into the gauging station into alignment with the gauging rod 44. Upon the inner side of the plate 55 there is provided a bar portion 59, the upper surface of which constitutes a supporting guide for the head end of the cartridge, and which is set in an angular recess 60 in the table in line with the guide bar 14 and with the upper supporting end of the ejection gate 52 disposed within the gap at the upper end of the chute 51 between the bar portion 59 and the bar 14. The bar portion 59 may be integrally formed with the plate 55, or it may be separately formed and secured thereto by welding or other suitable means.

The plate 55 is provided in its upper portion in line with the gauging rod with a cylindrical passage 61 slightly larger than the diameter of the head of the cartridge and extending to a circular recess 62 upon the outer side of the plate, this recess being provided in its flat base with a series of spaced pockets 63 for positioning pressure springs, as will presently more fully appear. Upon the outer side of the plate 55 in overlying relation to the recess 62 there is mounted a bearing block member 64 secured by means of countersunk screws 65 engaged in passages 66 in the block member, this block member being provided with a centrally disposed cylindrical guide passage 67 for the gauging rod, extending to a spherical surfaced socket 68 upon its inner surface arranged in opposed complementary relation to the recess 62, the diameter of this socket being slightly smaller than the diameter of the recess 62, and its spherical surface being generated from an axis point substantially in the plane of the inner surface of the plate 55 calculated as essentially coincident with the plane of the center of the end surface of the primer B in the head of the cartridge.

Within the socket 68 there is engaged for universal swiveling movement a spherical surfaced cartridge support member 69, provided centrally with a cylindrical extension 70 engaged through the passage 61 of the plate 55 with slight clearance, the shouldered surface 71 of this member, between its spherical surface and the extension 70, being slightly beveled outwardly and being substantially spaced from the base of the recess 62 to permit of the limited free rolling movement of the support member in its socket. The shouldered surface 70 is provided with a series of pockets 72 opposed to the pockets 63 of the recess 62, a series of pressure springs 73 being seated in these pockets and exerting pressure to retain the member 69 in firm contact with the socket 68 and to normally maintain it in coaxially aligned relation with the gauging rod. The member 69 is provided with a central cylindrical passage 74, normally in axial line with the guide passage 67 of the block member 64, and of slightly larger diameter than the end of the gauging rod engaged therein.

A bearing plate 75 for the end of the gauging rod is secured upon the outer side of the block member 64 by means of screw 76 engaged through holes 77 in the plate, a threaded guide bushing 78 being screwed into a threaded passage 79 in the plate and locked into position by means of a lock nut 80, the guide passage of this bushing constituting a slide bearing for the end of the gauging rod.

In operation the cartridge A is fed into the gauging station in axial line with the end of the support member 69 and the gauging rod, its head end being in contact with the end of the extension 70 of the bearing member and its point end being in engagement with the abutment guide bar 12. The gauging rod moves into contact with the center of the primer B of the cartridge through the inward movement of the slide 18, and if the height of the primer is within the allowable tolerances the gauging lever 46 remains in a substantially centralized position, so that it will enter the opening 32 of the gauge slide 30 as the slide 19 moves inwardly, and hence the trip mechanism for operating the release gate 62 will not be actuated. In the event that the primer is either high or low, movement will be imparted to the gauging lever 46 to bring its plug end 47 out of line with the opening 32, whereupon inward movement of the slide 19 causes relative movement to be imparted to the gauge slide 30 to actuate the trip mechanism causing the gate 52 to open, so that as the cartridge is fed from the gauging station during the succeeding feed movement its head end will be unsupported by the gate as it comes into register with the slot opening of the chute 51, and such rejected cartridge will drop down through the chute to a suitable receptacle.

In the event that the cartridge is in a misaligned position, as it is brought into relation with the gauging station, its tilted position will cause the support member 69 to roll into tilted position within the socket 68 in correspondence therewith, the tilting taking place about the axis of the spherical surface of the bearing member in exact coincidence with the center of the primer B of the cartridge, the periphery of the head of the cartridge moving into the passage 61 of the plate 55 at one side and away from it at the other side, as shown in Fig. 7. Hence, the misalignment of the cartridge will not change the position of the center of the primer where the end of the gauging rod contacts it, with the result that an accurate gauging takes place irrespective of the tilted position or the degree of tilt.

It is pointed out that previously the tilting of the cartridge in relation to a fixed supporting plate for its head end caused the center point of the primer to move away from the normal gauging point through fulcruming about the periphery of the head end, and consequently the gauging rod would project to an increased extent to engage the primer with the result that the tilted cartridge would be gauged as having a low primer, whereas it might in fact be perfect or high.

The form of the invention illustrated in the drawings and described herein is typical and illustrative only, and it is evident that the invention is capable of embodiments in other forms, all falling within the scope of the appended claims, which are to be broadly construed.

What is claimed is:

1. In a gauging apparatus, a bearing member having a spherical surfaced bearing socket, and a support member for engaging a part of an article to be gauged having a spherical surfaced bearing portion engaged in said socket, the axis point of said socket being coincident with a predetermined gauging point of said article, whereby upon misalignment of said article said support member moves correspondingly therewith without causing movement of said predetermined gauging point.

2. In a gauging apparatus, a bearing member having a spherical surfaced bearing socket, a support member for engaging a part of an article to be gauged having a spherical surfaced bearing portion engaged in said socket, the axis point of said socket being coincident with a predetermined gauging point of said article, whereby upon misalignment of said article said support member moves correspondingly therewith without causing movement of said predetermined gauging point, and yieldable spring means disposed between said bearing member and said support member to normally retain said support member in a neutral position of alignment with an aligned article.

3. In a gauging apparatus, support means for engaging a part of an article to be gauged, a flexible mounting for said support means adapted for movement of said support means about a predetermined gauging point of said article, whereby upon misalignment of said article said support means moves correspondingly therewith without causing movement of said predetermined gauging point, said support means having a gauge receiving passage therethrough extending to said gauging point, guide means having a guide passage coaxial with said passage of said support member; and a gauging rod slidable in said guide passage and engageable through said passage in said support means with said gauging point.

4. In a gauging apparatus, a bearing member having a spherical surfaced bearing socket, a support member for engaging a part of an article to be gauged having a spherical surfaced bearing portion engaged in said socket, the axis point of said socket being coincident with a predetermined gauging point of said article whereby upon misalignment of said article said support member moves correspondingly therewith without causing movement of said predetermined gauging point, said support means having an axial gauge receiving passage therethrough extending to said gauging point, guide means having a guide passage coaxial with said passage of said support member; and a gauging rod slidable in said guide passage and engageable through said passage in said support means with said gauging point, there being annular clearance between said gauging rod and said support member.

5. In combination in a gauging machine, an article feeding guideway for intermittently feeding articles to a gauging station, a fixed guide member in relation to said station disposed in alignment with guide means of said guideway adjacent thereto, and having an opening, support means in said opening for engaging a part of an article to be gauged, a flexible mounting for said support means adapted for movement of said support means about a predetermined gauging point of said article, whereby upon misalignment of said article said support means moves correspondingly therewith without causing movement of said predetermined gauging point, said support means having a gauge receiving passage therethrough extending to said gauging point, whereby gauging means is adapted to be contacted with said gauging point.

6. In a gauging apparatus, support means for engaging a part of an article to be gauged, a flexible mounting for said support, said support being movable in said mounting in accordance with the position of said article and at the same time maintaining the axis point of the support coincident with a predetermined gauging point of said supported part of the article, said support means having a gauge receiving passage therethrough extending to said gauging point, whereby gauging means is adapted to be contacted with said gauging point.

HARRY W. WINELAND.